(12) United States Patent
Shin et al.

(10) Patent No.: US 9,807,706 B2
(45) Date of Patent: *Oct. 31, 2017

(54) POWER CONTROL FOR DEVICES HAVING MULTIPLE ANTENNAS

(71) Applicant: INTERDIGITAL PATENT HOLDINGS, INC., Wilmington, DE (US)

(72) Inventors: Sung-Hyuk Shin, Northvale, NJ (US); Janet A. Stern-Berkowitz, Little Neck, NY (US); Changsoo Koo, Melville, NY (US); Mihaela C. Beluri, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 30 days.

This patent is subject to a terminal disclaimer.

(21) Appl. No.: 14/690,658

(22) Filed: Apr. 20, 2015

(65) Prior Publication Data

US 2015/0230190 A1 Aug. 13, 2015

Related U.S. Application Data

(63) Continuation of application No. 12/894,819, filed on Sep. 30, 2010, now Pat. No. 9,031,146.

(Continued)

(51) Int. Cl.
*H04W 52/32* (2009.01)
*H04W 52/14* (2009.01)
(Continued)

(52) U.S. Cl.
CPC ........ *H04W 52/325* (2013.01); *H04B 7/0413* (2013.01); *H04B 7/0689* (2013.01);
(Continued)

(58) Field of Classification Search
CPC ............. H04W 52/325; H04W 52/146; H04W 72/0413; H04B 7/0413
See application file for complete search history.

(56) References Cited

U.S. PATENT DOCUMENTS 6,226,507 B1    5/2001  Ramesh et al.
8,064,394 B2   11/2011  Jongren et al.
(Continued)

FOREIGN PATENT DOCUMENTS

CN    201167319 Y   12/2008
JP    2002502184 A   1/2002
(Continued)

OTHER PUBLICATIONS

3rd Generation Partnership Project (3GPP), R1-082807, "CM Analysis of UL Transmission for LTE-A", InterDigital Communications , LLC, TSG-RAN WG1 Meeting #54, Jeju, Korea, Aug. 18-22, 2008, pp. 1-8.

(Continued)

*Primary Examiner* — Rasheed Gidado
(74) *Attorney, Agent, or Firm* — Condo Roccia Koptiw LLP

(57) ABSTRACT

Power control for devices having multiple transmit antennas are disclosed, including power control methods for Physical Uplink Control Channel (PUCCH) and Sounding Reference Signal (SRS) transmissions for a wireless transmit/receive unit (WTRU). The PUCCH and SRS power control methods include selecting a multiple input multiple output (MIMO) mode and changing the power of the PUCCH or SRS transmission based on the selected MIMO mode. Another power control method estimates an antenna gain imbalance (AGI) for a WTRU having at least two transmit antennas. The AGI is based on measuring a Reference Signal Received Power (RSRP) on each transmit antenna. Each transmit antenna is then scaled by an AGI scaling factor based on the estimated AGI.

6 Claims, 6 Drawing Sheets

Related U.S. Application Data

(60) Provisional application No. 61/248,203, filed on Oct. 2, 2009.

(51) Int. Cl.
  *H04W 72/04* (2009.01)
  *H04B 7/04* (2017.01)
  *H04B 7/06* (2006.01)
  *H04B 7/08* (2006.01)
  *H04W 52/42* (2009.01)
  *H04B 7/0413* (2017.01)

(52) U.S. Cl.
  CPC ........ *H04B 7/0871* (2013.01); *H04W 52/146* (2013.01); *H04W 52/42* (2013.01); *H04W 72/0413* (2013.01)

(56) References Cited

U.S. PATENT DOCUMENTS

| | | | | |
|---|---|---|---|---|
| 8,155,063 | B2* | 4/2012 | Choi | H04L 5/0023 370/329 |
| 8,391,219 | B2 | 3/2013 | Ishii et al. | |
| 8,428,521 | B2* | 4/2013 | Luo | H04B 7/0413 455/101 |
| 8,625,703 | B2* | 1/2014 | Ko | H04B 7/0639 375/133 |
| 9,270,356 | B2* | 2/2016 | Chung | H04B 7/0684 370/252 |
| 9,414,322 | B2* | 8/2016 | Ahn | H04B 7/0689 |
| 2008/0080635 | A1 | 4/2008 | Hugl et al. | |
| 2008/0081655 | A1 | 4/2008 | Shin et al. | |
| 2008/0207150 | A1 | 8/2008 | Malladi et al. | |
| 2008/0220806 | A1 | 9/2008 | Shin et al. | |
| 2009/0268675 | A1 | 10/2009 | Choi | |
| 2010/0008216 | A1 | 1/2010 | Li et al. | |
| 2010/0118805 | A1 | 5/2010 | Ishii et al. | |
| 2010/0309870 | A1 | 12/2010 | Wengerter et al. | |
| 2010/0323711 | A1 | 12/2010 | Damnjanovic et al. | |
| 2011/0013615 | A1 | 1/2011 | Lee et al. | |
| 2011/0195735 | A1 | 8/2011 | Irmer et al. | |
| 2011/0207415 | A1 | 8/2011 | Luo et al. | |
| 2011/0244905 | A1 | 10/2011 | Burstrom et al. | |
| 2011/0261774 | A1 | 10/2011 | Lunttila et al. | |
| 2012/0014349 | A1 | 1/2012 | Chung et al. | |
| 2015/0173026 | A1 | 6/2015 | Ahn et al. | |

FOREIGN PATENT DOCUMENTS

| | | |
|---|---|---|
| JP | 2013501471 A | 1/2013 |
| JP | 2013504279 A | 2/2013 |
| WO | WO 2008/055179 A2 | 5/2008 |
| WO | WO 2008/123148 A1 | 10/2008 |
| WO | WO 2011/017464 A2 | 2/2011 |
| WO | WO 2011/031059 A2 | 3/2011 |

OTHER PUBLICATIONS

3rd Generation Partnership Project (3GPP), R1-084398, "Aspects to Consider for DL Transmission Schemes of LTE-A", Qualcomm Europe, TSG-RAN WG1 #55, Prague, Czech Republic, Nov. 10-14, 2008, pp. 1-11.

3rd Generation Partnership Project (3GPP), R1-090362, "Support of Concurrent Transmission of PUCCH and PUSCH in LTE-A Uplink", Qualcomm Europe, TSG-RAN WG1 Meeting #55bis, Ljubljana, Slovenia, Jan. 12-Jan. 16, 2009, pp. 1-3.

3rd Generation Partnership Project (3GPP), R1-090363, "CM Analysis of Concurrent PUSCH and PUCCH UL Transmission for LTE-A", Qualcomm Europe, TSG-RAN WG1 Meeting #55bis, Ljubljana, Slovenia, Jan. 12-Jan. 16, 2009, pp. 1-7.

3rd Generation Partnership Project (3GPP), R1-090430, "Alignment of RAN1/RAN4 Specification on UE Maximum Output Power", LG Electronics, TSG-RAN WG1 Meeting #55bis, Ljubljana, Slovenia, Jan. 12-Jan. 16, 2009, 9 pages.

3rd Generation Partnership Project (3GPP), R1-090588, "Further Analysis on Uplink SU-MIMO for E-UTRA", Texas Instruments, TSG RAN WG1#56, Athens, Greece, Feb. 9-13, 2009, pp. 1-9.

3rd Generation Partnership Project (3GPP), R1-090611, "Concurrent PUSCH and PUCCH Transmissions", Samsung, TSG RAN WG1#56, Athens, Greece, Feb. 9-13, 2009, pp. 1-2.

3rd Generation Partnership Project (3GPP), R1-090654, "PUCCH Piggybacking Onto PUSCH in Case of Transmit Power Limitation", LG Electronics, TSG RAN WG1#56, Athens, Greece, Feb. 9-13, 2009, 5 pages.

3rd Generation Partnership Project (3GPP), R1-090655, "Uplink Multiple Channel Transmission in Case of UE Transmit Power Limitation", LG Electronics, TSG RAN WG1#56, Athens, Greece, Feb. 9-13, 2009, pp. 1-3.

3rd Generation Partnership Project (3GPP), R1-092512, "Discussion on Fall-Back Mode in Uplink", LG Electronics, TSG RAN WG1 #57 bis, Los Angeles, USA, Jun. 29-Jul. 3, 2009, pp. 1-6.

3rd Generation Partnership Project (3GPP), R1-092644, "Multi-Antenna Support in UL PUSCH/PUCCH/PRACH/SRS Transmission", Motorola, 3GPP TSG RAN1#57bis, Los Angeles, USA, Jun. 29-Jul. 3, 2009, pp. 1-5.

3rd Generation Partnership Project (3GPP), R1-093704, "Way Forward for PUCCH Transmit Diversity Scheme", TSG RAN WG1 #58, Shenzhen, China, Aug. 23-28, 2009, 2 pages.

3rd Generation Partnership Project (3GPP), TR 36.814 V0.4.1, "Technical Specification Group Radio Access Network, Further Advancements for E-UTRA Physical Layer Aspects (Release 9)", Feb. 2009, pp. 1-31.

3rd Generation Partnership Project (3GPP), TR 36.814 V9.0.0, "Technical Specification Group Radio Access Network, Evolved Universal Terrestrial Radio Access (E-UTRA), Further Advancements for E-UTRA Physical Layer Aspects (Release 9)", Mar. 2010, pp. 1-104.

3rd Generation Partnership Project (3GPP), TS 25.101 V3.19.0, "Technical Specification Group Radio Access Networks, User Equipment (UE) Radio Transmission and Reception (FDD) (Release 1999)", Dec. 2006, pp. 1-66.

3rd Generation Partnership Project (3GPP), TS 25.101 V4.13.0, "Technical Specification Group Radio Access Networks, User Equipment (UE) Radio Transmission and Reception (FDD) (Release 4)", Dec. 2006, pp. 1-66.

3rd Generation Partnership Project (3GPP), TS 25.101 V5.20.0, "Technical Specification Group Radio Access Network, User Equipment (UE) Radio Transmission and Reception (FDD) (Release 5)", Dec. 2006, pp. 1-93.

3rd Generation Partnership Project (3GPP), TS 25.101 V6.19.0, "Technical Specification Group Radio Access Network, User Equipment (UE) Radio Transmission and Reception (FDD) (Release 6)", Mar. 2009, pp. 1-134.

3rd Generation Partnership Project (3GPP), TS 25.101 V6.8.0, "Technical Specification Group Radio Access Network, User Equipment (UE) Radio Transmission and Reception (FDD) (Release 6)", Jun. 2005, pp. 1-118.

3rd Generation Partnership Project (3GPP), TS 25.101 V7.16.0, "Technical Specification Group Radio Access Network, User Equipment (UE) Radio Transmission and Reception (FDD) (Release 7)", May 2009, pp. 1-172.

3rd Generation Partnership Project (3GPP), TS 25.101 V7.18.0, "Technical Specification Group Radio Access Network, User Equipment (UE) Radio Transmission and Reception (FDD) (Release 7)", Sep. 2010, pp. 1-172.

3rd Generation Partnership Project (3GPP), TS 25.101 V8.11.0, "Technical Specification Group Radio Access Network, User Equipment (UE) Radio Transmission and Reception (FDD) (Release 8)", Jun. 2010, pp. 1-214.

3rd Generation Partnership Project (3GPP), TS 25.101 V8.8.0, "Technical Specification Group Radio Access Network, User Equipment (UE) Radio Transmission and Reception (FDD) (Release 8)", Sep. 2009, pp. 1-217.

3rd Generation Partnership Project (3GPP), TS 25.101 V9.1.0, "Technical Specification Group Radio Access Network, User

(56) References Cited

OTHER PUBLICATIONS

Equipment (UE) Radio Transmission and Reception (FDD) (Release 9)", Sep. 2009, pp. 1-217.
3rd Generation Partnership Project (3GPP), TS 25.101 V9.4.0, "Technical Specification Group Radio Access Network, User Equipment (UE) Radio Transmission and Reception (FDD) (Release 9)", Jun. 2010, pp. 1-246.
3rd Generation Partnership Project (3GPP), TS 25.224 V7.10.0, "Technical Specification Group Radio Access Network, Physical Layer Procedures (TDD) (Release 7)", Mar. 2009, pp. 1-71.
3rd Generation Partnership Project (3GPP), TS 25.224 V8.3.0, "Technical Specification Group Radio Access Network, Physical Layer Procedures (TDD) (Release 8)", Mar. 2009, pp. 1-79.
3rd Generation Partnership Project (3GPP), TS 25.224 V8.5.0, "Technical Specification Group Radio Access Network, Physical Layer Procedures (TDD) (Release 8)", Sep. 2009, pp. 1-80.
3rd Generation Partnership Project (3GPP), TS 25.224 V8.7.0, "Technical Specification Group Radio Access Network, Physical Layer Procedures (TDD) (Release 8)", Mar. 2010, pp. 1-83.
3rd Generation Partnership Project (3GPP), TS 25.224 V9.1.0, "Technical Specification Group Radio Access Network, Physical Layer Procedures (TDD) (Release 9)", Mar. 2010, pp. 1-83.
3rd Generation Partnership Project (3GPP), TS 36.101 V8.10.0, "Technical Specification Group Radio Access Network, Evolved Universal Terrestrial Radio Access (E-UTRA), User Equipment (UE) Radio Transmission and Reception (Release 8)", Jun. 2010, pp. 1-161.
3rd Generation Partnership Project (3GPP), TS 36.101 V8.5.0, "Technical Specification Group Radio Access Network, Evolved Universal Terrestrial Radio Access (E-UTRA), User Equipment (UE) Radio Transmission and Reception (Release 8)", Mar. 2009, pp. 1-121.
3rd Generation Partnership Project (3GPP), TS 36.101 V9.4.0, "Technical Specification Group Radio Access Network, Evolved Universal Terrestrial Radio Access (E-UTRA), User Equipment (UE) Radio Transmission and Reception (Release 9)", Jun. 2010, pp. 1-183.
3rd Generation Partnership Project (3GPP), TS 36.211 V8.6.0, "Technical Specification Group Radio Access Network, Evolved Universal Terrestrial Radio Access (E-UTRA), Physical Channels and Modulation (Release 8)", Mar. 2009, pp. 1-82.
3rd Generation Partnership Project (3GPP), TS 36.211 V8.9.0, "Technical Specification Group Radio Access Network, Evolved Universal Terrestrial Radio Access (E-UTRA), Physical Channels and Modulation (Release 8)", Dec. 2009, pp. 1-83.
3rd Generation Partnership Project (3GPP), TS 36.211 V9.1.0, "Technical Specification Group Radio Access Network, Evolved Universal Terrestrial Radio Access (E-UTRA), Physical Channels and Modulation (Release 9)", Mar. 2010, pp. 1-85.
3rd Generation Partnership Project (3GPP), TS 36.213 V8.8.0, "Technical Specification Group Radio Access Network, Evolved Universal Terrestrial Radio Access (E-UTRA), Physical Layer Procedures (Release 8)", Sep. 2009, pp. 1-77.
3rd Generation Partnership Project (3GPP), TS 36.213 V9.2.0, "Technical Specification Group Radio Access Network, Evolved Universal Terrestrial Radio Access (E-UTRA), Physical Layer Procedures (Release 9)", Jun. 2010, pp. 1-80.
3rd Generation Partnership Project (3GPP), TS 36.300 V10.0.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 10)", Jun. 2010, pp. 1-183.
3rd Generation Partnership Project (3GPP), TS 36.300 V8.10.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Sep. 2009, pp. 1-146.
3rd Generation Partnership Project (3GPP), TS 36.300 V8.12.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Mar. 2010, pp. 1-22.
3rd Generation Partnership Project (3GPP), TS 36.300 V9.1.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 9)", Sep. 2009, pp. 1-165.
3rd Generation Partnership Project (3GPP), TS 36.300 V9.4.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 9)", Jun. 2010, pp. 1-171.
3rd Generation Partnership Project (3GPP), TS 36.321 V8.4.0, "Technical Specification Group Radio Access Network, Evolved Universal Terrestrial Radio Access (E-UTRA) Medium Access Control (MAC) Protocol Specification (Release 8)", Dec. 2008, pp. 1-43.
3rd Generation Partnership Project (3GPP), TS 36.321 V8.9.0, "Technical Specification Group Radio Access Network, Evolved Universal Terrestrial Radio Access (E-UTRA), Medium Access Control (MAC) Protocol Specification (Release 8)", Jun. 2010, pp. 1-47.
3rd Generation Partnership Project (3GPP), TS 36.321 V9.3.0, "Technical Specification Group Radio Access Network, Evolved Universal Terrestrial Radio Access (E-UTRA), Medium Access Control (MAC) Protocol Specification (Release 9)", Jun. 2010, pp. 1-48.
3rd Generation Partnership Project (3GPP), TS 36.331 V8.10.0, "Technical Specification Group Radio Access Network, Evolved Universal Terrestrial Radio Access (E-UTRA), Radio Resource Control (RRC), Protocol Specification (Release 8)", Jun. 2010, pp. 1-211.
3rd Generation Partnership Project (3GPP), TS 36.331 V8.7.0, "Technical Specification Group Radio Access Network, Evolved Universal Terrestrial Radio Access (E-UTRA) Radio Resource Control (RRC), Protocol Specification (Release 8)", Sep. 2009, pp. 1-208.
3rd Generation Partnership Project (3GPP), TS 36.331 V9.0.0, "Technical Specification Group Radio Access Network, Evolved Universal Terrestrial Radio Access (E-UTRA) Radio Resource Control (RRC), Protocol Specification (Release 9)", Sep. 2009, pp. 1-213.
3rd Generation Partnership Project (3GPP), TS 36.331 V9.3.0, "Technical Specification Group Radio Access Network, Evolved Universal Terrestrial Radio Access (E-UTRA), Radio Resource Control (RRC), Protocol Specification (Release 9)", Jun. 2010, pp. 1-250.
Grieco et al., "Uplink Single-User MIMO for 3GPP LTE", IEEE 18th International Symposium on Personal, Indoor and Mobile Radio Communications, IEEE, Athens, Greece, Sep. 3-7, 2007, pp. 1-5.
IEEE, "IEEE Standard for Local and Metropolitan Area Networks—Part 16: Air Interface for Fixed Broadband Wireless Access Systems—Amendment 2: Physical and Medium Access Control Layers for Combined Fixed and Mobile Operation in Licensed Bands and Corrigendum 1", IEEE Std 802.16e, IEEE Std 802.16e™-2005 and IEEE Std 802.16™2004/Cor1-2005, 2005, pp. 1-848.
IEEE, "IEEE Standard for Local and Metropolitan Area Networks—Part 16: Air Interface for Fixed Broadband Wireless Access Systems", IEEE Std 802.16m-09/0010r1a, Mar. 2008, pp. 1-351.
Kim et al., "Proposed Text on Power Control Section for the IEEE 802.16m Amendment", IEEE 802.16 Broadband Wireless Access Working Group, IEEE C802.16m-09/ 0634, Mar. 2, 2009, pp. 1-9.
Kim et al., "Uplink Power Control Design—Considerations and Mechanism", S802.16m-08/813, Jul. 16, 2008, 6 pages.

\* cited by examiner

POWER CONTROL FOR DEVICES HAVING MULTIPLE ANTENNAS

CROSS REFERENCE TO RELATED APPLICATION

This application is a continuation of U.S. non-provisional application Ser. No. 12/894,819, filed Sep. 30, 2010, which claims the benefit of U.S. provisional application No. 61/248,203 filed on Oct. 2, 2009, the contents of which are incorporated by reference herein.

FIELD OF THE INVENTION

This application is related to wireless communications.

BACKGROUND

In Third Generation Partnership Project (3GPP) long term evolution (LTE) Release 8 (R8) uplink (UL), wireless transmit/receive units (WTRUs) may transmit their data (and sometimes their control information) on the physical uplink shared channel (PUSCH). The evolved Node B (eNB) may schedule and control PUSCH transmission from each WTRU using an UL scheduling grant, which may be carried on a physical downlink control channel (PDCCH) format 0. As part of the uplink scheduling grant, the WTRU may receive control information on the modulation and coding set (MCS), the transmit power control (TPC) command, uplink resource allocation (e.g., the indices of allocated resource blocks), and the like. The WTRU may then transmit its PUSCH on the allocated UL resources using the corresponding MCS at a transmit power set by the TPC command.

The UL may also need to signal certain control signaling such as, but not limited to, acknowledgement/negative acknowledgement (ACK/NACK), Channel Quality Indicator (CQI), scheduling request (SR), and sounding reference signal (SRS) to support transmission of downlink (DL) and UL transport channels. If the WTRU has not been assigned an UL resource for data transmission, e.g., PUSCH, then the control information may be transmitted in an UL resource specially assigned for UL control signals on the PUCCH. These resources may be located at the edges of the total available cell bandwidth (BW). The transmit power for PUCCH may be controlled to ensure that the PUCCH is received at the cell site at an appropriate power.

In LTE R8, PUSCH and PUCCH transmissions of a given WTRU are scheduled to occur at different times. LTE-Advanced (LTE-A) may support simultaneous transmissions of PUSCH and PUCCH. Additionally, the LTE-A UL may support multiple transmit antennas (e.g., up to 4 antennas) with a possible maximum of two code words (transport blocks) for data transmission per UL component carrier. Multiple transmit antennas may be used for PUCCH and SRS transmissions, respectively. An antenna gain imbalance (AGI) may occur when using multiple antenna transmissions in the UL.

SUMMARY

Power control methods for devices using multiple transmit antennas for transmission in the uplink (UL) are disclosed herein. Methods include changing the power of a physical uplink control channel (PUCCH) transmission to a new level, the new level depending at least in part on a multiple input multiple output (MIMO) mode (a transmission mode configuration). Another method describes changing the power of sounding reference signal (SRS) transmission to a new level, the new level depending at least in part on a selected MIMO mode (or a transmission mode configuration). A method is provided to estimate an antenna gain imbalance (AGI) for transmit antennas based on measured Reference Signal Received Power (RSRPs) and each transmit antenna is scaled by an AGI scaling factor that is based on the estimated AGIs. The estimated AGIs may be expressed in terms of scaled relative AGIs with regard to a reference transmit antenna.

BRIEF DESCRIPTION OF THE DRAWINGS

A more detailed understanding may be had from the following description, given by way of example in conjunction with the accompanying drawings wherein.

DETAILED DESCRIPTION

Figure 1A:
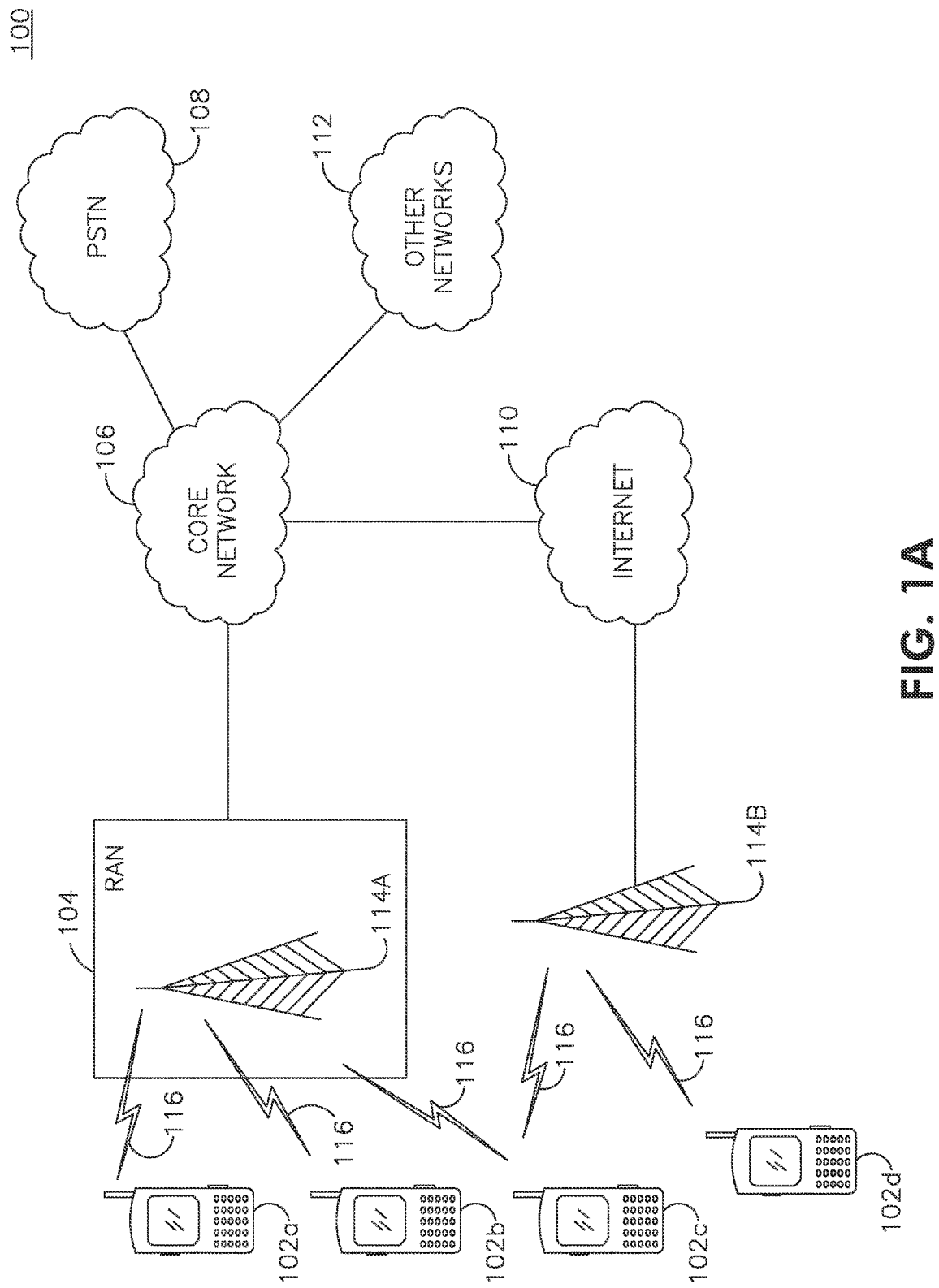
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
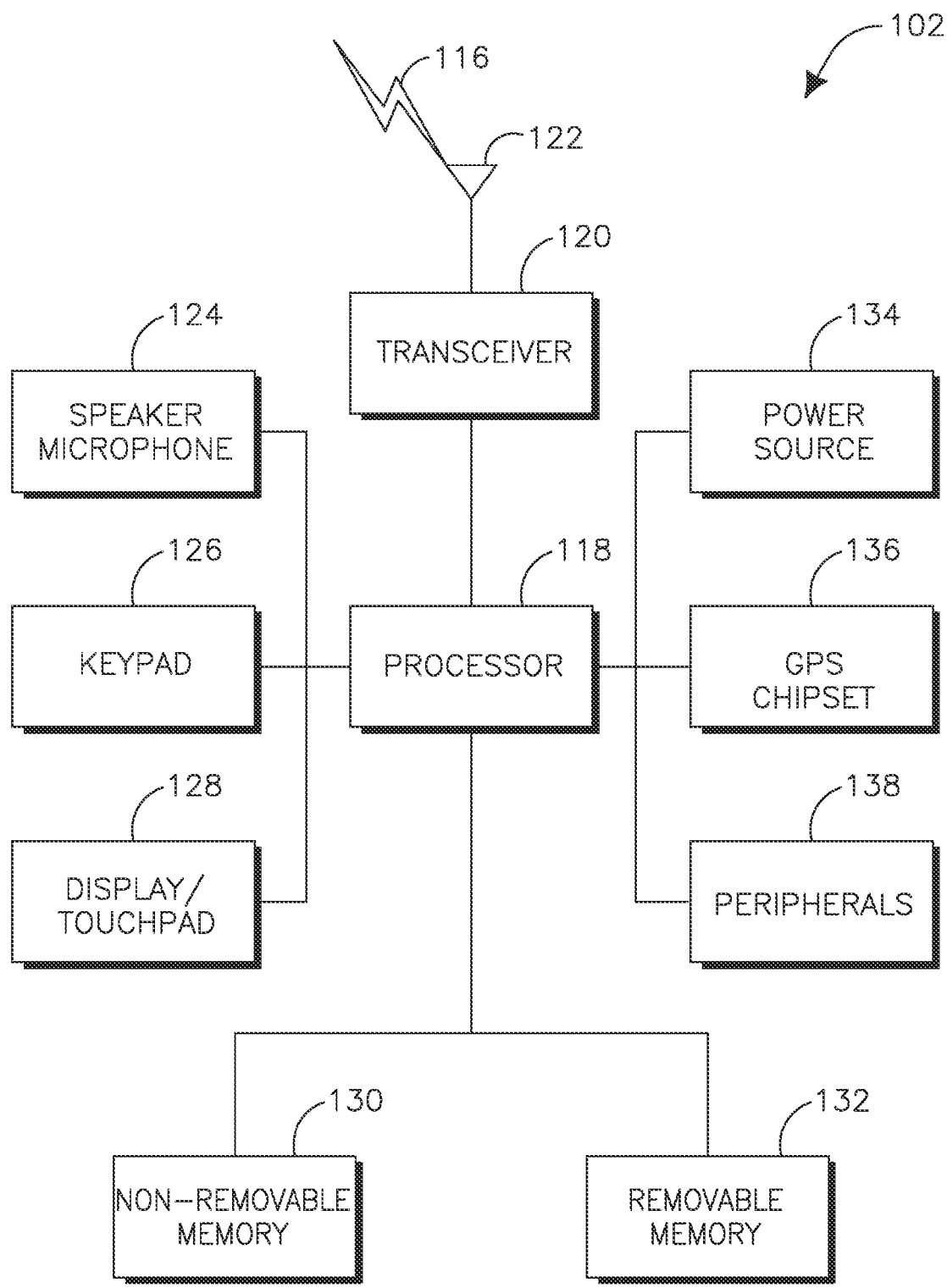
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
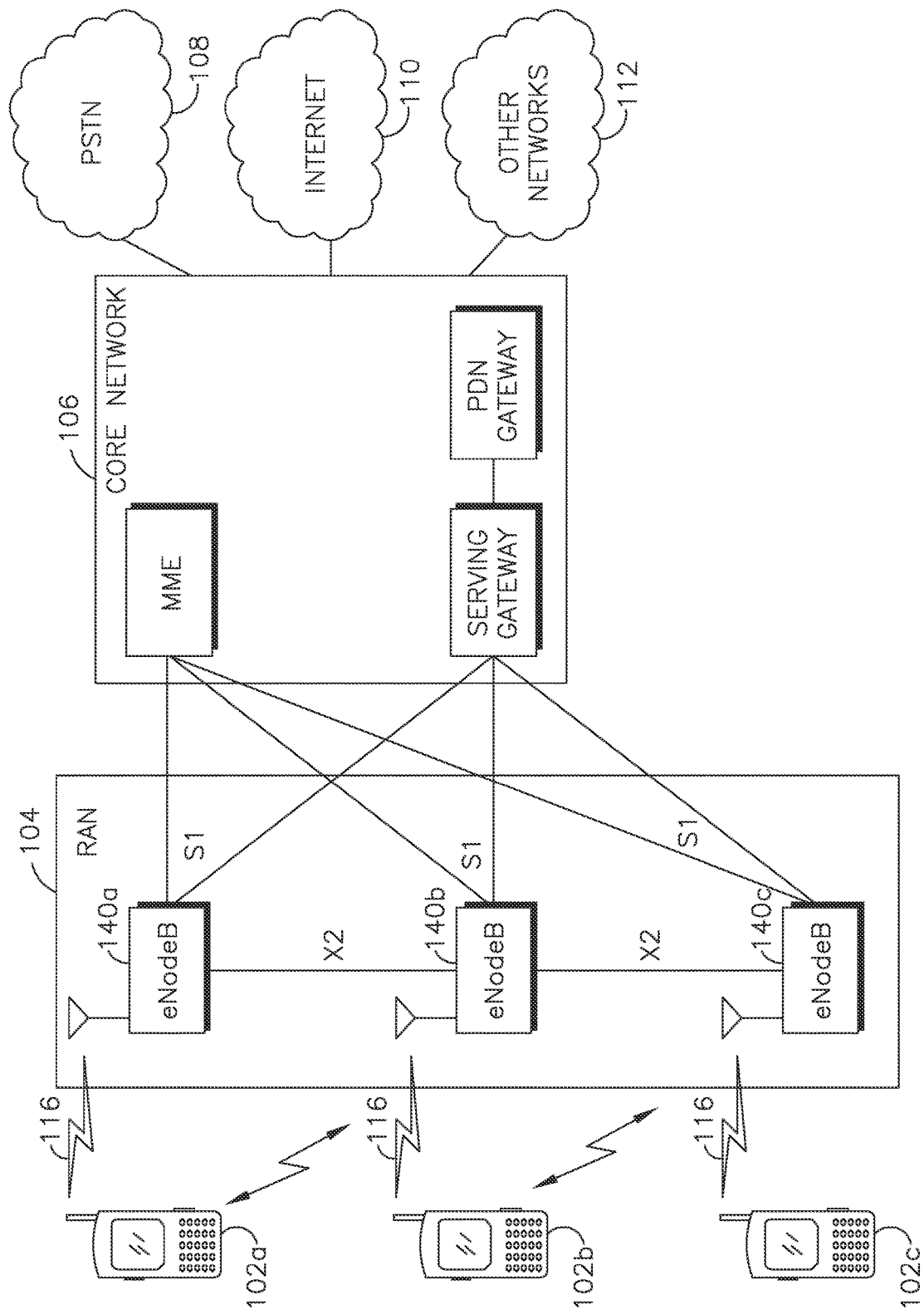
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. Though WTRUs 102a, 102b, and 102c are shown in FIG. 1C, the disclosed embodiments and examples may contemplate any number of WTRUs. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Third Generation Partnership Project (3GPP) long term evolution (LTE) Release 8 (R8) uplink (UL) wireless transmit/receive units (WTRUs) may include single antennas and, therefore, UL power control functionality in LTE R8 is applied to single transmissions from single transmit antennas. UL power control is applied to physical uplink shared channel (PUSCH) transmissions, physical uplink control channel (PUCCH) transmissions, and Sounding Reference Signals (SRSs) for a single transmit antenna.

LTE-Advanced (LTE-A) may support multiple WTRU transmit antennas (e.g., up to 4). For LTE-A PUSCH transmissions, several single user (SU) MIMO modes (also referred to herein as transmission modes or transmission schemes) may be applicable, including precoding spatial multiplexing (SM) MIMO, transmit diversity and single antenna port transmission. The eNB may configure the WTRU to use a particular MIMO mode (or transmission scheme) for PUS CH transmission. Similarly, for PUCCH transmissions in LTE-A, it may be expected that the eNB may configure the MIMO mode (or transmission scheme) via higher layer signaling. For example, when a LTE-A WTRU with multiple transmit antennas operates in a R8 network, the WTRU may need to revert to a fallback configuration (e.g., single antenna port transmission).

Typically, different MIMO modes have different MIMO (antenna) gains. For example, the MIMO gain (or transmit diversity gain) of space time transmit diversity (STTD) is about 3 dB (as compared with single antenna transmission) while the (Rank-1) beamforming (BF) MIMO mode may have more gain on average than STTD. For a given transmit power level, the received power levels may be different among various MIMO modes. Power control methods may be utilized to adapt to different MIMO gains in LTE-A UL MIMO transmissions as described herein.

Use of multiple transmit antennas for transmission in the UL may cause antenna gain imbalance (AGI) issues for MIMO. AGI may, for example, create link inefficiency due to the multiple antennas receiving different average received signal-to-noise ratios (SNRs) or the multiple antennas transmitting at different antenna gains. For example, pathloss measurements over different antennas may be different due to the position of each transmit antenna in a WTRU (for example, an antenna may be blocked in a hand-held WTRU). The AGI may, however, be compensated using power control methods as described herein.

When an R10 WTRU operates in an R8 network, and the R8 network is not aware that the WTRU has multiple transmit antennas, single antenna port transmission (single antenna transmission or any comparable transparent transmission) may be used for the R10 WTRU due to backward compatibility. That is, the R10 WTRU may be configured to revert to a fallback mode (e.g., transparent transmission mode), such as precoding vector switching (PVS), cyclic delay diversity (CDD), transmit antenna switching/selection, or single antenna port transmission (e.g., transmit beamforming), which are transparent to the R8 network. The power control for the R10 WTRU may be configured as described herein.

Power control methods are described herein that address WTRUs having multiple transmit antennas. One example method is directed to power control for PUCCH transmissions when using different UL MIMO modes. This method accounts for the different antenna gains associated with PUCCH transmissions in different MIMO modes (or transmission schemes). Another example method is directed to power control for SRS transmissions when using different UL MIMO modes (or transmission schemes). This method accounts for the fact that SRS and PUSCH transmissions may be independently configured for MIMO transmission. Another example method provides AGI compensation for multiple transmit antenna configurations. This example method addresses the effects caused by AGI resulting in differences in average received SNR between the received signals from the multiple antennas. Another example method provides a power control method for fallback transmission modes.

Although the example methods are described with respect to UL MIMO, the example methods may be extended to include support for carrier aggregation.

Described herein is a power control method for PUCCH transmission using a designated UL MIMO mode. In LTE-A, multiple MIMO mode options may be considered for PUCCH transmission, including, for example, single antenna port transmission and transmit diversity (e.g., spatial orthogonal resource transmit diversity (SORTD) for multiple resource PUCCH transmission with 2 transmit antennas). The transmit power levels for the individual MIMO modes may be different because, for example, different MIMO modes may have different antenna/beamforming/transmit diversity gains. Accordingly, the LTE power control formula may be modified for LTE-A PUCCH transmissions, according to equation (1):

$$P_{PUCCH}(i) = \min\{P_{CMAX,c}, P_{O\_PUCCH} + PL + h(n_{CQI}, n_{HARQ}) + \Delta_{F\_PUCCH}(F) + g(i) + \Delta_{PUCCH\_MIMO}\} \quad (1)$$

where certain terms in equation (1) are summarized below:

$P_{CMAX,c}$ is used to represent the CC (serving cell) specific maximum transmit power value for the primary cell (noting that PUCCH is transmitted only on the primary cell in LTE-A), which may take into account one or more of the signalled maximum power value, $P_{Max,c}$ for the serving cell, c, the maximum power of the WTRU power class, maximum power reduction (MPR) allowances, tolerances, and the like. $P_{CMAX,c}$ may be referred to as the configured maximum power (or configured maximum transmit power) for the CC; $P_{O\_PUCCH}$ is a parameter composed of the sum of a (cell specific) parameter $P_{O\_NOMINAL\_PUCCH}$ provided by higher layers and a (WTRU specific) component $P_{O\_WTRU\_PUCCH}$ provided by higher layers; PL is the downlink pathloss estimate calculated in the WTRU in dB; $h(n_{CQI}, n_{HARQ})$ is a PUCCH format dependent value, where $n_{CQI}$ corresponds to the number of information bits for the channel quality information (CQI) and $n_{HARQ}$ is the number of HARQ acknowledge/negative acknowledge (ACK/NACK) bits; $\Delta_{F\_PUCCH}(F)$ is provided by higher layers, where each $\Delta_{F\_PUCCH}(F)$ value corresponds to a PUCCH format (F) relative to PUCCH format 1a, where each PUCCH format (F) is defined; and $$g(i) = g(i-1) + \sum_{m=0}^{M-1} \delta_{PUCCH}(i - k_m)$$

where g(i) is the current PUCCH power control adjustment state and where g(0) is the first value after reset and where $\delta_{PUCCH}$ is a WTRU specific correction value, also referred to as a transmit power command (TPC) command, included in a physical downlink control channel (PDCCH) with, for example, downlink control information (DCI) format 1A/1B/1D/1/2A/2/2B (for the primary cell) or sent jointly coded with other WTRU specific PUCCH correction values on a PDCCH with, for example, DCI format 3/3A whose cyclic redundancy check (CRC) parity bits are scrambled with a TPC-PUCCH-radio network temporary identifier (TPC-PUCCH-RNTI).

The term $\Delta_{PUCCH\_MIMO}$ is a MIMO power offset for PUCCH, which is WTRU specific, and depends on the MIMO mode applied for PUCCH. Once the transmission mode for PUCCH is indicated to the WTRU, the PUCCH MIMO power offset may be determined by the WTRU. Alternatively, the PUCCH MIMO power offset may be provided to the WTRU.

The WTRU may determine the PUCCH MIMO power offset using a variety of methods. In one example method, the $\Delta_{PUCCH\_MIMO}$ may be provided by higher layers, such as by using a look up table (LUT) via semi static signaling. Alternatively, the $\Delta_{PUCCH\_MIMO}$ may be a pre-defined value (and, therefore may not need any signaling). Table 1 is an illustrative example of a LUT, which may be used to obtain the $\Delta_{PUCCH\_MIMO}$. The variables may be replaced with values, which may be different for different embodiments. For example, $\Delta_1$ and $\Delta_2$ may be -3 dB and -6 dB, respectively, and both $\Delta_5$ and $\Delta_6$ may be 0 dB (or $0 <= \Delta_5 < 3$ dB, $0 <= \Delta_5 < 3$ dB).

TABLE 1

| MIMO mode | $\Delta_{PUCCH\_MIMO}$ (dB) with 2 antennas | $\Delta_{PUCCH\_MIMO}$ (dB) with 4 antennas |
|---|---|---|
| Transmit (Tx) Diversity | $\Delta_1$ | $\Delta_2$ |
| BF | $\Delta_3$ | $\Delta_4$ |
| Single antenna port | $\Delta_5$ | $\Delta_6$ |

If a look up table (LUT) is used for $\Delta_{PUCCH\_MIMO}$, the LUT may be the same for all WTRUs and, therefore, may be broadcast. The WTRU may select from the table a value of $\Delta_{PUCCH\_MIMO}$, corresponding to the MIMO mode in use.

According to another embodiment, the eNB may signal a value of $\Delta_{PUCCH\_MIMO}$ to the WTRU. Here, the value may be WTRU-specific and may be signaled, for example, via dedicated signaling.

According to another embodiment, the value of $\Delta_{PUCCH\_MIMO}$ may be absorbed in an existing power control parameter such as $P_{O\_PUCCH}$ (e.g., in $P_{O\_UE\_PUCCH}$) or $\Delta_{F\_PUCCH}(F)$. In this case, $\Delta_{PUCCH\_MIMO}$ may be removed from the PUCCH power control in equation (1). The range of $P_{O\_UE\_PUCCH}$ (or $\Delta_{F\_PUCCH}(F)$) may also need to be revised accordingly as $\Delta_{PUCCH\_MIMO}$ is now added to $P_{O\_PUCCH}$ (or $\Delta_{F\_PUCCH}(F)$).

In either case, the calculated WTRU transmit power may be distributed evenly among the active antennas (or antenna ports) in the WTRU.

Figure 2:
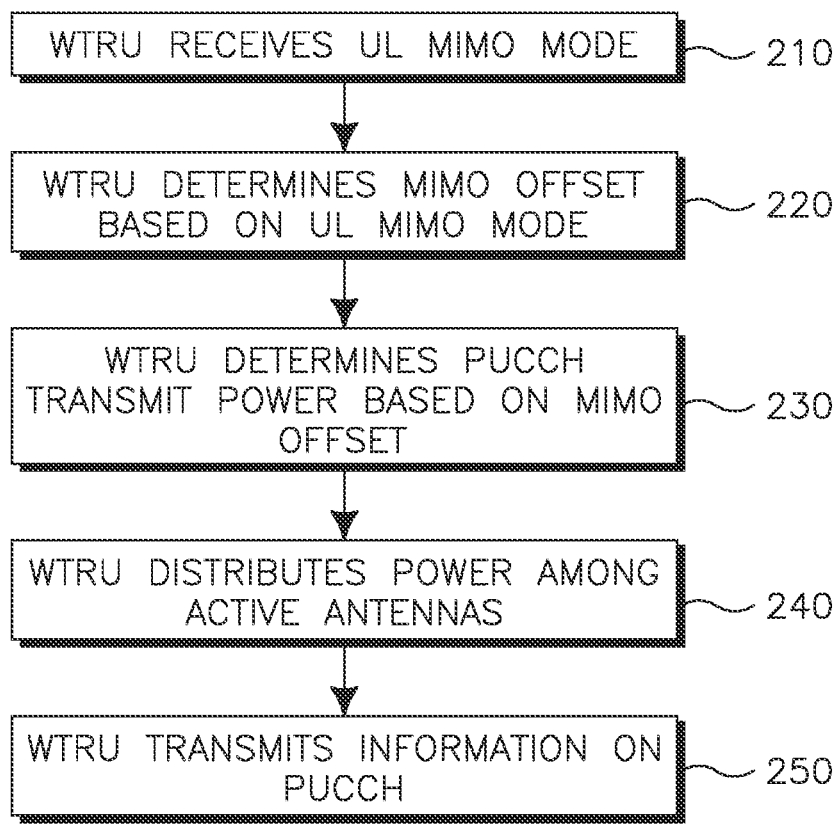
FIG. 2 is an example power control flowchart for physical uplink channel transmissions when using uplink (UL) multiple input multiple output (MIMO)

Referring to FIG. 2, there is shown an example power control flowchart 200 for physical uplink channel transmissions when using uplink (UL) multiple input multiple output (MIMO) as described herein. Initially, a WTRU may receive an UL MIMO mode selection from the base station or eNB (210). The WTRU may then determine the MIMO offset based on the selected UL MIMO mode (220). The WTRU may then calculate the PUCCH transmit power based, in part, on the MIMO offset (230). The PUCCH transmit power may then be distributed evenly amongst the transmit antennas (240). For example, the PUCCH transmit power may be distributed amongst active transmit antennas (or antenna ports). The WTRU transmits information over the PUCCH using the calculated transmit power (250).

Described herein is a power control method for SRS transmission using a designated UL MIMO mode.

In LTE R8, the WTRU transmit power, $P_{SRS}$, for the SRS transmitted on subframe i, may be defined as set forth in equation (2):

$$P_{SRS}(i) = \min\{P_{CMAX}, P_{SRS\_OFFSET} + 10\log_{10}(M_{SRS}) + P_{O\_PUSCH}(j) + \alpha(j) \cdot PL + f(i)\} \text{ [dBm]} \quad (2)$$

where certain terms in equation (2) are summarized below:

$P_{CMAX}$ is the configured maximum WTRU power;

For $K_S = 1.25$, $P_{SRS\_OFFSET}$ is a 4-bit WTRU specific parameter semi-statically configured by higher layers with 1 dB step size in the range [-3, 12] dB and for $K_S = 0$, $P_{SRS\_OFFSET}$ is a 4-bit WTRU specific parameter semi-statically configured by higher layers with 1.5 dB step size in the range [-10.5, 12] dB; Ks is given by the WTRU specific parameter deltaMCS-Enabled provided by higher layers; $M_{SRS}$ is the bandwidth of the SRS transmission in subframe i expressed in number of resource blocks; $P_{O\_PUSCH}(j)$ is a parameter composed of the sum of a (cell specific nominal) component $P_{O\_NOMINAL\_PUSCH}(j)$ provided from higher layers for j=1 and a (WTRU specific) component $P_{O\_WTRU\_PUSCH}(j)$ provided by higher layers for j=1, where j=1 for PUSCH (re)transmissions corresponding to a dynamic scheduled grant; For α(j) where j=1 α∈{0, 0.4, 0.5, 0.6, 0.7, 0.8, 0.9, 1} is a 3-bit cell specific parameter provided by higher layers; PL is the downlink pathloss estimate calculated in the WTRU in dB; and f(i) is the current power control adjustment state for the PUSCH.

The LTE UL power control may be limited to, for example, only one carrier and one transmit antenna (e.g., LTE UL may not support single user MIMO (SU-MIMO)). In LTE-A, UL SU-MIMO and carrier aggregation may be supported and the power control formula for SRS may be modified as described herein.

For both LTE-A and LTE, the same TPC command for a UL serving cell (component carrier) may be used for both PUSCH and SRS transmissions on the serving cell. Further, PUSCH and SRS transmissions may be independently configured with a MIMO mode, e.g., PUSCH with precoding MIMO but SRS with single antenna port transmission.

Considering the above two aspects, an example power control method includes modifying the LTE UL power control formula such that setting the WTRU transmit power for the SRS transmitted in the n-th antenna port (or layer) in subframe i on serving cell, c, may be defined as shown in equation (3):

$$P_{SRS,c}(i,n) = \min\{P_{CMAX,c}, P_{SRS\_OFFSET,c} + 10 \log_{10}(M_{SRS,c}(i,n)) + P_{O\_PUSCH,c}(j) + \alpha_c(j) \cdot PL_c(n) + f_c(i) + \Delta_{SRS\_MIMO}\} \quad (3)$$

where n is the antenna port (or layer) index and i is the sub-frame number. The term $P_{CMAX,c}$ is used to represent the CC (serving cell) specific maximum transmit power value for serving cell, c, which may take into account one or more of the signaled maximum power value, $P_{Max,c}$ for the serving cell, c, the maximum power of the WTRU power class, maximum power reduction (MPR) allowances, tolerances, and the like. $P_{CMAX,c}$ may be referred to as the configured maximum power (or configured maximum transmit power) for the serving cell, c, and f(i) is the current power control adjustment state for the PUSCH for the serving cell, c.

The term $P_{SRS\_OFFSET,c}$ is a parameter semi-statically configured for serving cell, c, by higher layers. With UL MIMO (e.g., up to four antennas) for PUSCH, there may be various MIMO modes/options (including spatial multiplexing (SM) MIMO (SM MIMO), transmit diversity, and BF/single antenna port transmission) for PUSCH transmission. However, the SRS transmission mode with multiple antennas may be deterministic (or semi-static) such as multiple antenna port transmission or single antenna port transmission. In that case, different $P_{SRS\_OFFSET,c}$ values may be required for different MIMO options for PUSCH. The range of $P_{SRS\_OFFSET,c}$ values may be modified appropriately.

The term $M_{SRS,c}(i,n)$ is the bandwidth (BW) of the SRS transmission over the n-th antenna port (or layer) in subframe i and serving cell, c, in terms of the number of resource blocks (RBs). It may be possible for each antenna port (or layer) to use a different (flexible) number of RBs (e.g., allowing different SRS densities in frequency), for example, in order to reduce SRS overhead in MIMO. Alternatively, $M_{SRS,c}(i,n)$ may be the same for all n. In this case, the index n may be removed.

The term $PL_c(n)$ is the pathloss estimate calculated for the n-th antenna port in the WTRU for serving cell c in dB. The same pathloss may be used for all the antenna ports. In this case, the index n may be removed such that $PL_c(n) = PL_c$.

In LTE-A, $P_{O\_PUSCH,c}(j)$ may be extended to UL MIMO such that j represents the transmission mode and MIMO mode. For instance, j=0, 1, 2 may represent the same transmission mode as in LTE, while j=3, 4, 5, . . . , M, may represent the MIMO mode for PUSCH transmission. Alternatively, as in LTE, j is fixed to 1 for $P_{O\_PUSCH,c}(j)$.

The term $\Delta_{SRS\_MIMO}$ is an SRS MIMO offset parameter, which represents a MIMO gain difference between the MIMO mode used for PUSCH and the MIMO mode used for SRS. Note that SRS may be precoded. For example, when PUSCH uses a single antenna port mode and SRSs are transmitted over multiple antennas (e.g., two antennas), $\Delta_{SRS\_MIMO}$ may be set to approximately 3 dB. $\Delta_{SRS\_MIMO}$ may be provided by higher layers, such as by using a look up table via semi static signaling. Table 2 is an illustrative LUT for $\Delta_{SRS\_MIMO}$. The variables may be replaced with values, which may depend on the specific method.

TABLE 2

| MIMO mode for PUSCH (with 4 Tx antennas) | SRS Tx mode (with 4 Tx antennas) | $\Delta_{SRS\_MIMO}$ (dB) |
| --- | --- | --- |
| Open loop SM MIMO Rank-2 Rank-3 Rank-4 | Multi antenna port Tx Single-antenna port Tx | [1.0 0.5 0] dB for rank-2, rank-3, and rank-4, respectively, when multi-antenna port Tx for SRS [−1.0 −2.0 −3.0] dB for rank-2, rank-3, and rank-4, respectively, when single-antenna port Tx for SRS |
| Closed loop SM MIMO Rank 2 Rank 3 Rank 4 | Multi antenna port Tx Single-antenna port Tx | [1.0 0.5 0] dB for rank-2, rank-3, and rank-4, respectively, when multi-antenna port Tx for SRS [−1.0 −2.0 −3.0] dB for rank-2, rank-3, and rank-4, respectively, when single-antenna port Tx for SRS |
| Tx Diversity | Multi antenna port Tx Single-antenna port Tx | 3 dB when multi-antenna port Tx for SRS 2 dB when single-antenna port Tx for SRS |
| Single antenna port transmission | Multi antenna port Tx Single-antenna port Tx | [3 or 6] dB when multi-antenna port Tx with 2 and 4 antenna ports, respectively, for SRS 0 dB when single-antenna port Tx for SRS |

If an LUT is used for $\Delta_{SRS\_MIMO}$, it may be the same for all WTRUs, and it may be broadcast. In this case, the WTRU may select from the table a value of $\Delta_{SRS\_MIMO}$ that corresponds to the MIMO mode applied for PUSCH transmission and the MIMO mode applied for SRS transmission.

Alternatively, the eNB may signal a value of $\Delta_{SRS\_MIMO}$ to a WTRU, where the value is WTRU-specific. For instance, $\Delta_{SRS\_MIMO}$ may be signaled in a PDCCH (e.g., UL grant). Alternatively, $\Delta_{SRS\_MIMO}$ may be signaled by higher layers (e.g., via RRC signaling).

According to another example method, the $\Delta_{SRS\_MIMO}$ may be absorbed in an existing power control parameter such as $P_{O\_PUSCH,c}$ (e.g., in $P_{O\_UE\_PUSCH,c}$) or $P_{SRS\_OFFSET,c}$ so that the term $\Delta_{SRS\_MIMO}$ may be removed from equation (3). In this case, the range of $P_{O\_UE\_PUSCH,c}$ or $P_{SRS\_OFFSET,c}$ may need to be modified to account for $\Delta_{SRS\_MIMO}$.

In another embodiment, when the SRS bandwidth is the same for all the antenna ports simultaneously transmitted on serving cell c (i.e., $M_{SRS,c}(i,n) = M_{SRS,c}(i)$), the total power of SRS transmissions over the (active) antenna ports, denoted by $P_{SRS,c}(i)$, may be determined in subframe i on serving cell, c, as shown in equation (4):

$$P_{SRS,c}(i) = \min\{P_{CMAX,c}, P_{SRS\_OFFSET,c} + 10\log_{10}(M_{SRS,c}(i)) + P_{O\_PUSCH,c}(j) + \alpha_c(j) \cdot PL_c + f_c(i) + \Delta_{SRS\_MIMO}\} \quad (4)$$

In this case, the calculated total transmit power for SRS may be distributed evenly among the active antennas (or antenna ports) in the WTRU. The variables/parameters are as defined previously.

With UL MIMO (e.g., with up to four antennas), if simultaneous SRS transmissions over multiple transmit antennas occur, the transmit power density of SRS for each antenna (or antenna port) may get lower as the number of antennas (or antenna ports) increases. This may degrade channel estimation performance at the eNB. This degradation in estimation performance may be resolved using the example methods described herein. In one example method, the eNB may signal the WTRU, via higher layers, to switch to time division multiplexing (TDM) mode for SRS transmission, such as one SRS transmission in a single antenna (or at most two SRS transmissions over two antennas) in each SRS subframe.

In another example method, when the sum of the WTRU transmit powers (i.e., sum($P_{SRS,C}(i,n)$) where the summation is done over all the antenna ports n, in Equation (3)) (or total SRS transmit power before limiting to $P_{CMAX,c}$ in Equation (4)) for SRS transmissions simultaneously transmitted over multiple antennas exceeds a maximum WTRU power (or configured transmit power, $P_{CMAX,c}$ for serving cell, c) by a predefined threshold, the WTRU may select one SRS (possibly more SRSs if transmit power is available) to be transmitted in the next SRS subframe. The selection may be based on a rotation manner.

In another example method, SRS bandwidth (BW) (i.e., $M_{SRS}(i,n)$ or $M_{SRS}(i)$) may be adjusted (or reconfigured) appropriately by the eNB and signaled to the WTRU via higher layers. In another embodiment, when the WTRU is power limited (e.g., total SRS transmit power before limiting to $P_{CMAX,c}$ in Equation (4) exceeds $P_{CMAX,c}$ (or WTRU power class, denoted by $P_{powerclass}$) by a threshold, the WTRU is (re)configured to switch to single antenna port transmission for SRS (from multi antenna port transmission).

Described herein are power reduction methods in the event the sum of the required transmit powers (as in Equation (3)) for simultaneous SRS transmissions over multiple antennas exceeds a maximum WTRU power (or configured transmit power, $P_{CMAX,c}$ for serving cell, c). In one example method, the transmit powers for the individual SRS transmissions may be reduced evenly to meet the maximum power constraint. In another example method, $P_{CMAX,c}$ may be defined per power amplifier (PA) in equation (3). In this method, the configured (WTRU) transmit power may be equally distributed among the multiple PAs. That is, Pcmax, $c_{pa}$ (dB)=Pcmax,c−10×log 10(Npa) where Npa is the number of active PAs in the WTRU in a given SRS subframe for serving cell c. With respect to equation (3), Pcmax,$c_{pa}$ is substituted for Pcmax,c. In this case the $\Sigma$ Pcmax,$c_{pa}$ may be less than or equal to Pcmax,c.

Figure 3:
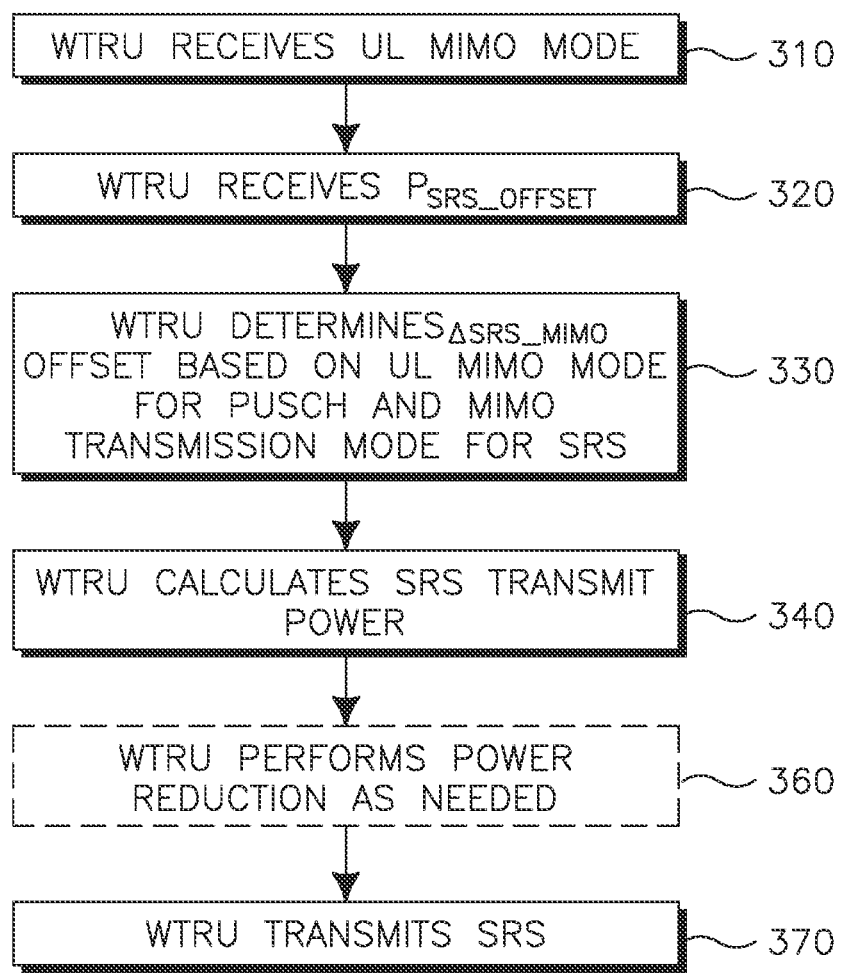
FIG. 3 is an example power control flowchart for Sounding Reference Signals (SRSs) when using UL MIMO.

Referring to FIG. 3, there is shown an example power control flowchart 300 for SRS transmissions when using UL MIMO as described herein. Initially, a WTRU may receive an UL MIMO mode selection/configuration for SRS transmission from the base station or eNB (310). The WTRU may then receive from the base station a $P_{SRS\_OFFSET,c}$ (320). The WTRU may then determine the $\Delta_{SRS\_MIMO}$ offset based on the UL MIMO mode for PUSCH and MIMO transmission mode for SRS (330). Alternatively, as stated previously, the $P_{SRS\_OFFSET,c}$ may include the $\Delta_{SRS\_MIMO}$, in which case the $P_{SRS\_OFFSET,c}$ may be based on the selected UL MIMO mode. A SRS transmit power is then calculated based, in part, on the $P_{SRS\_OFFSET,c}$ and the $\Delta_{SRS\_MIMO}$ offset (340). The WTRU may perform power reduction methods if the (total) SRS transmit power is greater than a threshold such as for example the configured WTRU maximum transmit power (360). This may happen, for example, if the WTRU may be transmitting simultaneous SRS transmissions. The WTRU transmits the SRS at the SRS transmit power (370).

Described herein are power control methods to address antenna gain imbalance (AGI). When multiple antenna transmissions are made in the UL, there may be an issue with AGI. This may create link inefficiency because it may result in differences in average received signal-to-noise (SNR) between the signals received from the multiple antennas. For example, path loss measurements over different antennas may be different due to the position of each transmit antenna in the WTRU (for example, an antenna may be blocked in a hand-held WTRU). The AGI may be compensated by employing the power control methods described herein.

In an example method, the WTRU performs AGI estimation followed by AGI compensation. For AGI estimation, the WTRU may perform a Reference Signal Received Power (RSRP) measurement on each antenna (or antenna port). In case of carrier aggregation, the RSRP measurement may be performed on a downlink (DL) anchor or primary component carrier (CC) (i.e., primary cell) or a reference DL CC associated with the UL serving cell (CC). Alternatively, all configured DL CCs may be used for the RSRP measurement. A filtering approach may be used for the RSRP measurement. For example, a higher layer (e.g., Layer 3) filter configuration may be used for the RSRP measurement.

Based on the RSRP measurement on each antenna (or antenna port), the WTRU may estimate the AGI among the antennas (or antenna ports) used for the UL transmission. The AGI may be expressed in terms of a scaled relative AGI with regard to a reference transmit antenna.

The WTRU performs AGI compensation on each transmit antenna after estimating the AGI on the individual transmit antennas (or antenna ports). The WTRU may scale each transmit antenna to compensate for the adverse impact of AGI. For example, assume that a WTRU includes N transmit antennas and the estimated AGI for each antenna is denoted as AGI(i) on a linear scale (and i is the antenna index). The WTRU may scale each transmit antenna by an AGI compensation scaling factor, $\beta(i)$, where $$\beta(i) = \sqrt{\frac{\frac{1}{AGI(i)}}{\sum_{m}^{N} \frac{1}{AGI(m)}}}$$

and where AGI(i)<=1.

In another method, the eNB may estimate the AGI on each individual transmit antenna (or antenna port) of the WTRU and provide an AGI correction factor for the WTRU via an L1 layer (e.g., similar to providing TPC commands per antenna) or higher layers (e.g., radio resource control (RRC) signaling). For example, the above AGI compensation scaling factor, $\beta(i)$, may be determined by the eNB and then signaled to the WTRU through RRC signaling.

In another method, the AGIs for each transmit antenna (or antenna port) may be compared with a threshold value, and antenna(s) with too high an AGI value may be turned off or fall-back to, for example, single antenna port transmission mode. For example, if the AGI impact from a transmit antenna is too adverse on link performance (e.g., the AGI value is too high), the WTRU may turn off the antenna(s) having the AGI values that are too high or fall-back to another mode (e.g., single antenna port transmission mode).

Figure 4:
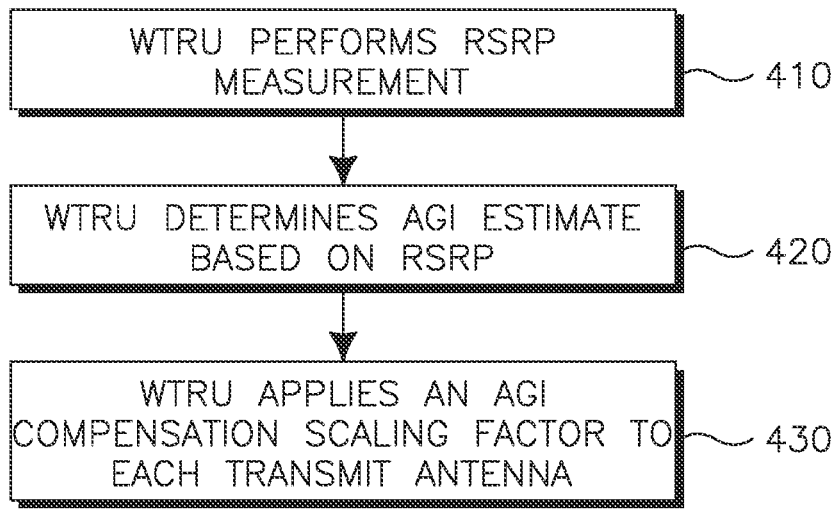
FIG. 4 is an example power control flowchart for antenna gain imbalance (AGI) compensation.

Referring to FIG. 4, there is shown an example power control flowchart 400 for AGI compensation as described herein. Initially, a WTRU may perform a RSRP measurement (410). The WTRU may then determine an AGI estimate based on the RSRP (420). The WTRU may then apply an AGI compensation scaling factor to each transmit antenna (430).

Figure 5:
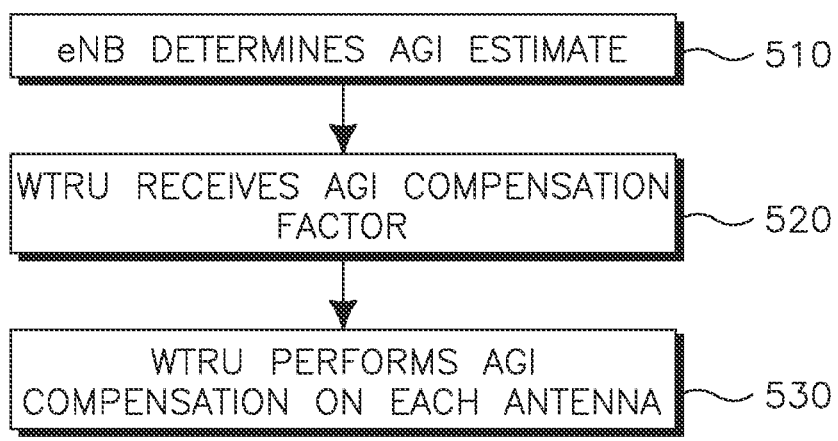
FIG. 5 is another example power control flowchart for AGI compensation.

Referring to FIG. 5, there is shown another example power control flowchart 500 for AGI compensation as described herein. Initially, a base station may determine an AGI estimate for the WTRU (510). The WTRU may then receive an AGI compensation factor from the base station (520). The WTRU may then apply the AGI compensation factor on each transmit antenna (530).

Described herein is a power control method for fallback transmission mode. By way of example, when a WTRU (that is, for example, configured to operate with a particular network such LTE R10) operates in a network other than the one that it is configured for use with (e.g., LTE R8) and that is, for example, not aware that the WTRU has multiple transmit antennas, the WTRU may operate in another mode, such as single antenna (port) transmission mode (or comparable transparent transmission mode) to take advantage of backward compatibility. In other words, in an example embodiment, an R10 WTRU may be configured to revert to a fallback mode (e.g., transparent transmission mode), such as precoding vector switching (PVS), CDD (cyclic delay diversity), or single antenna port transmission (e.g., transmit beamforming), which is transparent to the R8 network. The WTRU may also be configured to enter a fallback transmission mode in certain other cases. For example, when the UL MIMO channels for a WTRU are highly correlated, the WTRU may use transmit beamforming. In this example, the power control for the R10 WTRU may need to be configured accordingly. In an example power control method for fallback transmission, when the WTRU is in the fallback transmission mode for a physical channel, the eNB and WTRU may operate the LTE R8 power control method (or a power control method for single antenna port transmission) for the physical channel.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for Physical Uplink Control Channel (PUCCH) power control performed by a wireless transmit/receive unit (WTRU), the method comprising:
   receiving, from a network device, a radio resource control (RRC) message comprising a PUCCH configuration indicating whether the WTRU is configured to transmit PUCCH using two or more antenna ports;
   configuring the WTRU according to the received PUCCH configuration; and
   determining a physical uplink control channel (PUCCH) transmit power, wherein:
      on a condition that the WTRU is not configured to transmit PUCCH on two or more antenna ports, the PUCCH transmit power is determined with a multiple input multiple output (MIMO) PUCCH power offset value set to zero, and
      on a condition that the WTRU is configured to transmit PUCCH on two or more antenna ports, the PUCCH transmit power is determined based on at least a MIMO PUCCH power offset value received in the RRC message.

2. The method of claim 1, wherein on a condition that the WTRU is configured to transmit PUCCH on two or more antenna ports, the PUCCH transmit power is split equally across the two or more of antenna ports.

3. The method of claim 1, wherein the MIMO PUCCH power offset value is WTRU specific.

4. A wireless transmit/receive unit (WTRU) comprising:
   a processor configured to at least:
      receive, a radio resource control (RRC) message comprising a Physical Uplink Control Channel (PUCCH) configuration indicating whether the WTRU is configured to transmit PUCCH using two or more antenna ports;
      configure the WTRU according to the received PUCCH configuration; and
      determine a physical uplink control channel (PUCCH) transmit power, wherein:
         on a condition that the WTRU is not configured to transmit PUCCH on two or more antenna ports, the PUCCH transmit power is determined with a multiple input multiple output (MIMO) PUCCH power offset value set to zero, and
         on a condition that the WTRU is configured to transmit PUCCH on two or more antenna ports, the PUCCH transmit power is determined based on at least a MIMO PUCCH power offset value received in the RRC message.

5. The WTRU of claim 4, wherein on a condition that the WTRU is configured to transmit PUCCH on two or more antenna ports, the PUCCH transmit power is split equally across the two or more of antenna ports.

6. The WTRU of claim 4, wherein the MIMO PUCCH power offset value is WTRU specific.

* * * * *